United States Patent
Stenzel et al.

(10) Patent No.: US 7,566,433 B2
(45) Date of Patent: Jul. 28, 2009

(54) PRECIPITATED SILICAS WITH A PARTICULAR PORE SIZE DISTRIBUTION

(75) Inventors: Oleg Stenzel, Cologne (DE); Anke Blume, Weilerswist (DE); Hans-Detlef Luginsland, Hoboken, NJ (US); Ralf Schmoll, Bonn (DE); Herbert Thoma, Swisttal (DE); Stefan Uhrlandt, Belle Mead, NJ (US); Andre Wehmeier, Rheine (DE)

(73) Assignee: Degussa AG, Dusseldorf (DE)

( * ) Notice: Subject to any disclaimer, the term of this patent is extended or adjusted under 35 U.S.C. 154(b) by 329 days.

(21) Appl. No.: 11/517,396

(22) Filed: Sep. 8, 2006

(65) Prior Publication Data

US 2007/0059232 A1    Mar. 15, 2007

(30) Foreign Application Priority Data

Sep. 9, 2005   (DE)   ............... 10 2005 043 201

(51) Int. Cl.
*C01B 33/12* (2006.01)
*C01B 33/18* (2006.01)
*C01B 33/187* (2006.01)
*C01B 33/193* (2006.01)

(52) U.S. Cl. ..................... 423/335; 423/339
(58) Field of Classification Search ............... 423/335, 423/339
See application file for complete search history.

(56) References Cited

U.S. PATENT DOCUMENTS 4,094,771 A    6/1978   Brandt et al.
4,704,414 A    11/1987  Kerner et al.
5,116,886 A    5/1992   Wolff et al.
5,484,581 A    1/1996   Esch et al.
5,846,506 A    12/1998  Esch et al.
5,925,708 A    7/1999   Esch et al.
6,013,234 A    1/2000   Ray et al.
6,123,762 A    9/2000   Barthel et al.
6,127,468 A    10/2000  Cruse et al.
6,140,445 A    10/2000  Su et al.
6,180,076 B1   1/2001   Uhrlandt et al.
6,204,339 B1   3/2001   Waldman et al.
6,207,783 B1   3/2001   Petty et al.
6,258,914 B1   7/2001   Su et al.
6,268,424 B1 * 7/2001   Blume et al. ............... 524/493
6,323,277 B1   11/2001  Petty et al.
6,395,856 B1   5/2002   Petty et al.
6,414,061 B1   7/2002   Cruse et al.
6,515,043 B2   2/2003   Petty et al.
6,528,673 B2   3/2003   Cruse et al.
6,602,964 B2   8/2003   Huang et al.
6,608,125 B2   8/2003   Cruse et al.
6,613,309 B2   9/2003   Uhrlandt et al.

(Continued)

FOREIGN PATENT DOCUMENTS

DE    24 47 613 A1    4/1976

(Continued)

*Primary Examiner*—Timothy C Vanoy
*Assistant Examiner*—Serena L Hanor
(74) *Attorney, Agent, or Firm*—Oblon, Spivak, McClelland, Maier & Neustadt, P.C.

(57) ABSTRACT

Precipitated silicas which have a broad pore size distribution of the pores with a pore diameter smaller than that of the maximum of the derivative of the pore volume distribution function are useful, for example, for tires.

23 Claims, 2 Drawing Sheets

Typical curve of negative logarithmic derivative of cumulative pore volume $V$ with respect to pore diameter $x$ with the features $a$, $b$, $A$ and $B$.

U.S. PATENT DOCUMENTS

| | | |
|---|---|---|
| 6,624,230 B2 | 9/2003 | Luginsland |
| 6,683,135 B2 | 1/2004 | Cruse et al. |
| 6,702,887 B2 | 3/2004 | Uhrlandt et al. |
| 6,846,865 B2 | 1/2005 | Panz et al. |
| 6,849,754 B2 | 2/2005 | Deschler et al. |
| 6,893,495 B2 | 5/2005 | Korth et al. |
| 6,899,951 B2 | 5/2005 | Panz et al. |
| 6,960,251 B2 | 11/2005 | Uhrlandt et al. |
| 6,977,065 B1 | 12/2005 | Esch et al. |
| 6,984,683 B2 | 1/2006 | Luginsland et al. |
| 7,022,375 B2 | 4/2006 | Schachtely et al. |
| 7,071,257 B2 | 7/2006 | Esch et al. |
| 7,074,457 B2 | 7/2006 | Panz et al. |
| 7,074,876 B2 | 7/2006 | Cruse et al. |
| 7,078,551 B2 | 7/2006 | Cruse et al. |
| 7,081,500 B2 | 7/2006 | Cruse et al. |
| 7,208,038 B2 | 4/2007 | Korth et al. |
| 7,220,449 B2 | 5/2007 | Schachtely et al. |
| 2001/0021761 A1 | 9/2001 | Petty et al. |
| 2002/0055564 A1 | 5/2002 | Cruse et al. |
| 2002/0055568 A1 | 5/2002 | Cruse et al. |
| 2002/0055646 A1 | 5/2002 | Cruse et al. |
| 2002/0099118 A1 | 7/2002 | Cruse et al. |
| 2002/0115811 A1 | 8/2002 | Huang et al. |
| 2002/0169248 A1 | 11/2002 | Esch et al. |
| 2003/0003040 A1 * | 1/2003 | Lindner et al. ............... 423/335 |
| 2003/0082090 A1 | 5/2003 | Blume et al. |
| 2003/0130388 A1 | 7/2003 | Luginsland et al. |
| 2003/0225195 A1 | 12/2003 | Cruse et al. |
| 2003/0229166 A1 | 12/2003 | Krafczyk et al. |
| 2004/0210001 A1 | 10/2004 | Cruse et al. |
| 2005/0032965 A1 | 2/2005 | Valero |
| 2005/0187334 A1 | 8/2005 | Blume et al. |
| 2005/0282951 A1 | 12/2005 | Esch et al. |
| 2006/0001470 A1 | 1/2006 | Owen |
| 2006/0014870 A1 | 1/2006 | Cruse et al. |
| 2006/0093541 A1 | 5/2006 | Uhrlandt et al. |
| 2006/0099129 A1 | 5/2006 | Stenzel et al. |
| 2006/0100344 A1 | 5/2006 | Stenzel et al. |
| 2006/0137575 A1 | 6/2006 | Stenzel et al. |
| 2006/0165581 A1 | 7/2006 | Stenzel et al. |
| 2006/0254463 A1 | 11/2006 | Luginsland et al. |
| 2007/0100057 A1 | 5/2007 | Stenzel et al. |

FOREIGN PATENT DOCUMENTS

| | | |
|---|---|---|
| DE | 3437 473 A1 | 4/1986 |
| DE | 40 04 781 A1 | 8/1991 |
| DE | 196 09 619 A1 | 9/1997 |
| DE | 101 63 945 C1 | 5/2003 |
| DE | 102 23 658 A1 | 12/2003 |
| DE | 103 58 449 A1 | 8/2004 |
| EP | 0 643 015 A1 | 3/1995 |
| EP | 0 647 591 A1 | 4/1995 |
| EP | 0 937 755 A1 | 8/1999 |
| WO | WO 99/09036 | 2/1999 |
| WO | WO 03/016215 A1 | 2/2003 |

* cited by examiner

Figure 1: Typical curve of negative logarithmic derivative of cumulative pore volume $V$ with respect to pore diameter $x$ with the features $a$, $b$, $A$ and $B$.

PRECIPITATED SILICAS WITH A PARTICULAR PORE SIZE DISTRIBUTION

BACKGROUND OF THE INVENTION

1. Field of the Invention

The present invention relates to precipitated silicas with a broad pore size distribution of the pores with a pore diameter smaller than that of the maximum of the derivative of the pore volume distribution function, to a process for their production and to their use.

Precipitated silicas have long been used in elastomer mixtures, an example being tires. U.S. Pat. No. 6,013,234, EP 0647591 and WO 03/016215 provide examples here.

Stringent requirements are placed upon silicas used in tires. The intention is that they can be dispersed easily and effectively in the rubber and can enter into rapid and effective bonding with the respective polymer chains of the rubber used by way of a coupling agent, e.g. bifunctional silanes. Greater effectiveness of this phenomenon during the mixing process leads to better abrasion resistance in the finished tire. Other important properties are described via the specific surface areas (BET or CTAB) and the oil absorption capacity (DBP).

Introduction of silica technology in what are known as "green tires" has permitted a dramatic reduction in rolling resistance, while abrasion performance has remained at approximately the level of a tire filled only with Carbon Black. Constantly rising raw material prices and an awareness of responsibility for the environment have led to increasing importance placed on further improvements in abrasion resistance and rolling resistance of tire mixtures.

SUMMARY OF THE INVENTION

It is an object of the present invention to provide precipitated silicas with improved application-related properties, in particular when used as reinforcing fillers in elastomer mixtures. A further object is to provide a process for production of the silicas of the present invention.

Other objects not explicitly mentioned are apparent from the entire context of the description, examples and claims.

Surprisingly, it has been found that this object is achieved via the precipitated silicas of the present invention defined in more detail in the description below and also in the claims and in the examples.

DETAILED DESCRIPTION OF THE INVENTION

Figure 1:
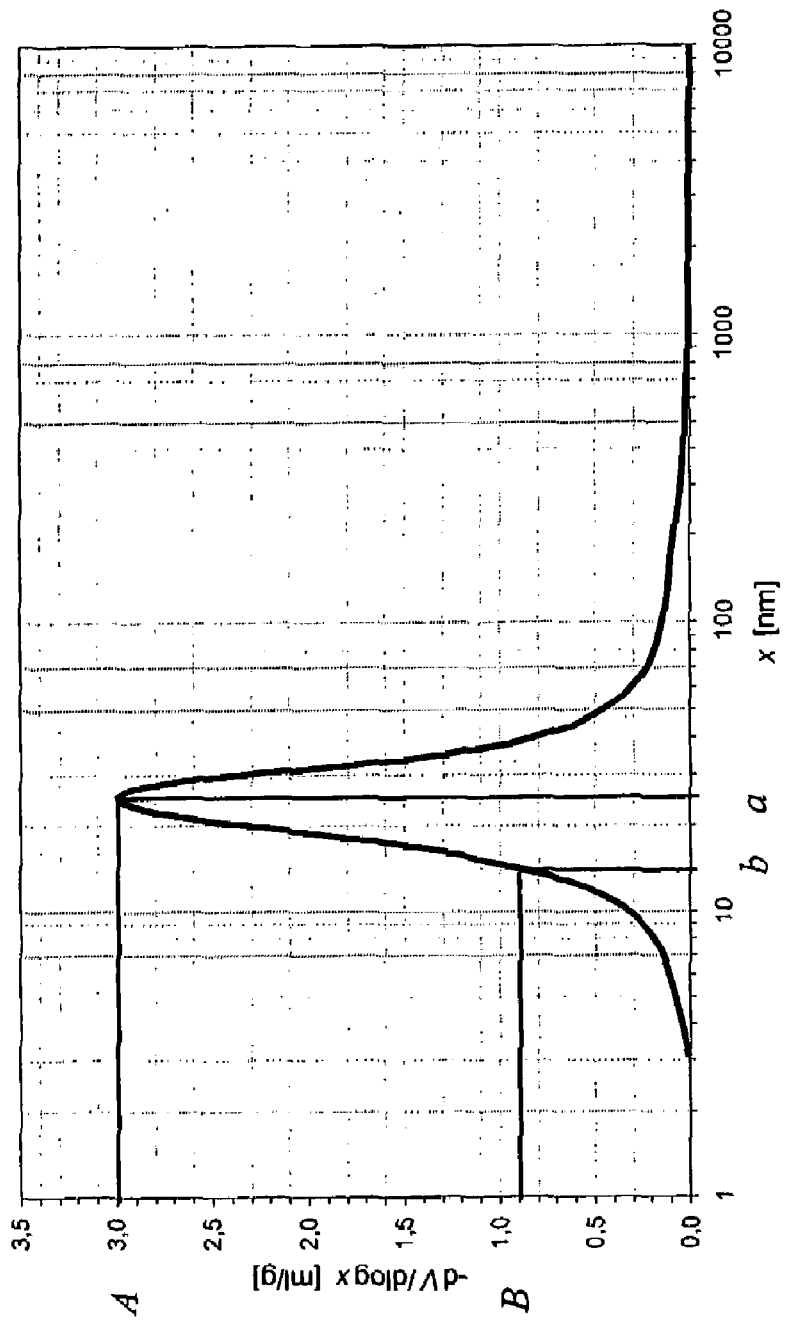
FIG. 1 shows the negative logarithmic derivative of cumulative pore volume with respect to pore diameter of the silica of the present invention.

In one embodiment, the present invention provides precipitated silicas characterized via the following physicochemical parameters:

| | |
|---|---|
| Relative breadth γ of pore size distribution | 4.0-10.0 (g nm)/ml, |
| Sears number $V_2$ | 28-40 ml/(5 g), |
| Sears number $V_2$/CTAB ratio | 0.18-0.28 ml/(5 m$^2$), |
| CTAB | 100-200 m$^2$/g. |

In another embodiment, the present invention further provides precipitated silicas which have, alongside the parameters mentioned, one or more of the following physicochemical parameters:

| | |
|---|---|
| DBP number | from 200 to 330 g/(100 g), |
| Zeta potential at pH 5 | from −12 to −30 mV, |
| BET/CTAB ratio | >1.3, |
| Primary particle diameter | 10-40 nm, |
| Al$_2$O$_3$ content | <5% by weight, |
| Sieve residue (Ro-Tap, >300 μm) | ≧80% by weight, |
| Sieve fraction (Ro-Tap, <75 μm) | ≦10% by weight, |
| Carbon content | from 0.1 to 20.0% by weight | and which take the form of powders or take the form of approximately spherical particles (microgranulated materials) or of granulated materials.

The present invention also provides a process for production of the precipitated silicas.

In yet another embodiment, the present invention likewise provides the use of the silicas in an elastomer mixture, vulcanizable rubber mixture and/or another vulcanizate, for example a pneumatic or other tire, a tire tread, cable sheathing, a hose, a drive belt, a conveyor belt, a V-belt, a roller covering, a shoe sole, a gasket or a damping element.

Another embodiment provides an elastomer mixture, a vulcanizable rubber mixture, or any other vulcanizate, and also a tire, comprising the silicas.

One of the advantages of the precipitated silicas of the present invention is that after their incorporation into rubber they bring about a low level of hysteresis, meaning that mechanic-dynamic loading of the mixture causes very little heat generation, an example of the consequence being low rolling resistance of a tire. Furthermore, a good dispersion coefficient and a high level of reinforcement is achieved, giving a very low tire abrasion value.

Overall, the particular properties of the precipitated silicas of the present invention, and in particular the high relative breadth γ of the pore size distribution,
the high density of silanol groups,
the BET/CTAB ratio
therefore lead to the following advantages:

by virtue of the pore size distribution, extremely low hysteresis loss after incorporation into elastomer mixtures and rubber mixtures, by virtue of the specific CTAB surface area values, a high level of reinforcement and improved abrasion performance in elastomer mixtures and rubber mixtures, good dispersion performance at the same time as good performance with regard to incorporation into the rubber.

The low zeta potential at pH 5 contributes to high rubber activity and crosslinking density.

The subject matters of the invention are described in detail below.

The terms silica and precipitated silica are used synonymously in the present invention.

The silicas of the present invention have broad pore size distribution of the pores with a pore diameter smaller than that of the maximum of the derivative of the pore volume distribution function, which is determined by means of mercury porosimetry. Because there are various available forms of silicas—e.g. powders, spherical particles or granulated materials—mechanical pressure-treatment of the silica has to take place in order to obtain a measured value independent of the available form.

The pore volume determined by mercury porosimetry in the range from 3.5 nm to 5 µm is then evaluated. For this, an algorithm is applied to the data of the negative logarithmic derivative of cumulative pore volume, and first determines the most frequent, characteristic pore diameter. This is typically in the range from 10 to 100 nm. The characteristic pore diameter includes all values and subvalues therebetween, especially including 20, 30, 40, 50, 60, 70, 80, and 90 nm. Starting from that value, further evaluation takes place as stated in the experimental section. The result is a relative breadth $\gamma$ of the pore size distribution which takes into account asymmetric pore size distributions. The relative breadth $\gamma$ is therefore a characteristic feature which can be determined with good reproducibility and which is independent of the available form and which describes only the pores whose diameter is smaller than that of the most frequent pores (cf. FIG. 1). This pore size range corresponds mainly to the pore volume between the primary particles which have accreted to give silica aggregates, and permits a conclusion to be drawn concerning their aggregation. The relative breadth $\gamma$ of the pore size distribution brings about a low level of hysteresis after incorporation of the precipitated silicas into rubber, inter alia, and thus ensures that a tire has low rolling resistance. The relative breadth $\gamma$ of the pore size distribution is preferably in the range from 4.3 to 10.0 (g nm)/ml, particularly preferably from 4.3 to 8.0 (g mn)/ml and very particularly preferably from 4.5 to 8.0 (g nm)/ml, or else from 4.6 to 7.0 (g nm)/ml. The relative breadth $\gamma$ of the pore size distribution includes all values and subvalues therebetween, especially including 4.5, 5, 5.5, 6, 6.5, 7, 7.5, 8, 8.5, 9 and 9.5 (g nm)/ml.

The precipitated silicas of the present invention moreover have a high absolute Sears number $V_2$. The Sears number $V_2$ is a measure that can describe the number of silanol groups of the silica (cf. R. K. Iler, "The Chemistry of Silica", John Wiley & Sons (1979)). The Sears number $V_2$ of the silicas of the present invention is in the range from 28 to 40 ml/(5 g), preferably from 28 to 38 ml/(5 g) and particularly preferably from 28 to 36 ml/(5 g) and from 29 to 36 ml/(5 g). The Sears number includes all values and subvalues therebetween, especially including 30, 32, 34, 36 and 38 ml/(5 g).

However, the statement of the absolute number of silanol groups alone is not always suitable for adequate characterization of a precipitated silica, because precipitated silicas with high surface area generally have a higher absolute number of silanol groups than precipitated silicas with a low surface area. The Sears number $V_2$ therefore has to be related to the surface area of the silica. For the application, the CTAB surface area is to be regarded as more important than the BET surface area, because it is a measure of the surface area accessible from outside and therefore available for crosslinking with the rubber system. The quotient Sears number $V_2$/CTAB is therefore important. This is therefore a method of representing the reinforcement potential generated via the silanol groups per unit of external surface area introduced and therefore per unit of specific surface area accessible to the coupling partner. A feature of the silicas of the present invention is a markedly increased ratio of the Sears number $V_2$ to the CTAB surface area, of from 0.18 to 0.28 ml/(5 $m^2$), when comparison is made with known precipitated silicas. This means that the precipitated silicas of the present invention have a very large number of silanol groups, in particular in relation to the external surface area. The ratio of the Sears number $V_2$ to the CTAB surface area is preferably in the range from 0.18 to 0.28 ml/(5 $m^2$) and particularly preferably from 0.19 to 0.27 ml/(5 $m^2$). The ratio of the Sears number $V_2$ to the CTAB surface area includes all values and subvalues therebetween, especially including 0.19, 0.2, 0.21, 0.22, 0.23, 0.24, 0.25, 0.26, 0.27 ml/(5 $m^2$).

The silanol groups on the silica surface in rubber mixtures function as possible chemical reaction partners for a coupling reagent which permits coupling of the silica to the rubber matrix. A maximum number of silanol groups therefore achieves high probability of coupling between silica and the coupling reagent and thus a high probability of coupling of the silica to the rubber matrix, and this finally leads to higher reinforcement potential.

The specific CTAB surface area is of primary and decisive importance for the reinforcing property of the silica (cf. Janzen, Kraus, Rubber Chem. Technol. 44, 1287 (1971)). The reinforcement potential increases with increasing CTAB surface area. A feature of the precipitated silicas of the present invention is therefore a CTAB surface area which is preferably from 105 to 195 $m^2$/g, particularly preferably from 110 to 190 $m^2$/g and very particularly preferably from 110 to 175 $m^2$/g. In one particular embodiment, the CTAB surface area is in the range from 100 to 139 $m^2$/g and preferably in the range from 105 to 135 $m^2$/g. In another particular embodiment, the precipitated silicas of the present invention have a CTAB surface area of from 141 to 200 $m^2$/g and preferably from 145 to 190 $m^2$/g and very particularly preferably from 145 to 175 $m^2$/g. The CTAB surface area includes all values and subvalues therebetween, especially including 105, 110, 115, 120, 125, 130, 135, 140, 145, 150, 155, 160, 165, 170, 175, 180, 185, 190 and 195 $m^2$/g.

Alongside the relative breadth $\gamma$ of the pore size distribution, another criterion of the silicas of the present invention is the nature of the pores, i.e. whether they are accessible to the rubber or not. The nature of the pores is described via the BET/CTAB quotient. A high BET/CTAB quotient shows microporosity and therefore a high proportion of "internal" surface—accessible by way of example to the small nitrogen molecule but not to rubber. The BET/CTAB ratio of the silicas of the present invention may be greater than 1.3, and preferably is in the range from 1.3 to 2.5, particularly preferably in the range from 1.6 to 2.4 and very particularly preferably in the range from 1.7 to 2.2. In one specific embodiment of the present invention, the BET/CTAB ratio is from 1.3 to 1.69, preferably from 1.4 to 1.69. The BET/CTAB ratio includes all values and subvalues therebetween, especially including 1.4, 1.5, 1.6, 1.7, 1.8, 1.9, 2, 2.1, 2.2, 2.3, 2.4.

The specific BET surface area (cf. S. Brunauer, P. H. Emmett, E. Teller, "Adsorption of Gases in Multimolecular Layers", J. Am. Chem. Soc. 60, 309 (1938)) describes the effect of the silica on performance during incorporation into the rubber, the properties of the crude mixture, and also the vulcanization kinetics. The BET surface area of the silicas of the present invention is preferably greater than the CTAB surface area by a factor of at least 1.3, particularly preferably by a factor of at least 1.6, being smaller than 500 $m^2$/g, and is very particularly preferably greater than the CTAB surface area by a factor of from 1.6 to 2.5, being smaller than 400 $m^2$/g, and is in particular greater than the CTAB surface area by a factor of from 1.65 to 2.2, being smaller than 350 $m^2$/g. In one specific embodiment of the present invention, the BET surface area is greater than the CTAB surface area by a factor of from 1.3 to 1.7, preferably by a factor of from 1.4 to 1.69.

Further information on surface activity and also the coupling power of the coupling reagent to the silica is obtained via determination of the zeta potential. The method here detects the sound waves emitted from an aqueous suspension of the silica at a prescribed pH in a high-frequency electrical field. These are produced by virtue of the surface charges on the silica and therefore represent a measure, for the coupling reaction, of the charged silanol groups available. The silicas of the present invention can advantageously have a zeta potential at pH 5 of from −12 to −30 mV. The zeta potential is preferably from −12 to −25 mV, particularly preferably from −13 to −21 mV and very particularly preferably from −13 to −19 mV. The zeta potential includes all values and subvalues therebetween, especially including −14, −16, −18, −20, −22, −24, −26, −28 mV.

It has moreover been found that high DBP absorption of the silicas of the present invention is useful for achieving good dispersion. However, a factor to be taken into account here is that the DBP number is reduced by any granulation process carried out, and therefore it is permissible only to compare silicas within one available form. The silicas of the present invention can have a DBP from 200 to 330 g/(100 g). The DBP number is preferably from 250 to 330 g/(100 g) for powders and spherical particles (microgranulated materials) or else from 200 to 270 g/(100 g) for granulated materials. The DBP includes all values and subvalues therebetween, especially including 210, 220, 230, 240, 250, 260, 270, 280, 290, 300, 310, 320 g/(100 g).

The silicas of the present invention can have an aluminum oxide content of from 0.001 to 5% by weight, preferably from 0.001 to 0.5% by weight, particularly preferably from 0.01 to 0.3% by weight and very particularly from 0.01 to 0.15% by weight. The aluminum oxide content includes all values and subvalues therebetween, especially including 0.005, 0.01, 0.05, 0.1, 0.5, 1, 1.5, 2, 2.5, 3, 3.5, 4, 4.5% by weight.

The precipitated silicas of the present invention can be present in various available forms, for example in the form of a powder whose $d_{50}$ particle size determined by means of laser scattering is from 1 to 80 μm. The $d_{50}$ includes all values and subvalues therebetween, especially including 5, 10, 15, 20, 25, 30, 35, 40, 45, 50, 55, 60, 65, 70, 75 μm. The pulverulent particles can have an irregular, or else a regular, external shape, meaning that they can by way of example also be in essence spherical. The precipitated silicas of the present invention can also take the form of particles (microgranulated materials) which are in essence spherical whose particle size $d_{50}$ determined by means of sieve residue determination (Alpine) is from 80 μm to 1000 μm. The $d_{50}$ includes all values and subvalues therebetween, especially including 100, 150, 200, 250, 300, 350, 400, 450, 500, 550, 600, 650, 700, 750, 800, 850, 900 and 950 μm. In the last-mentioned instance, the silicas of the present invention are preferably produced by means of spray tower drying, as described in EP 0937755, and exhibit an external shape characteristic of this method of drying (see figures in EP 0937755). The content of EP 0937755 is hereby expressly incorporated by way of reference into the content of the present application. If the precipitated silicas of the present invention take the form of granulated materials ($d_{50}$>1000 μm (Alpine sieve residue)), their particle size distribution after granulation is preferably such that the size of at least 80% by weight of the particles is greater than 300 μm and that of at most 10% by weight are smaller than 75 μm, by means of sieve-residue determination (Ro-Tap).

The preferred ranges mentioned can be set independently of one another.

The precipitated silicas of the present invention can be produced by the following process:

a) an aqueous solution of an alkali metal silicate or of an alkaline earth metal silicate and/or of an organic and/or inorganic base is used as initial charge, the alkali number of the initial charge being from 20 to 40, b) alkali metal silicate and/or alkaline earth metal silicate and an acidifier is simultaneously metered into this initial charge with intensive stirring at from 55 to 85° C. until viscosity rises, c) the feed is stopped for from 35 to 85 minutes, preferably while maintaining the temperature reached at the end of stage b), d) alkali metal silicate and/or alkaline earth metal silicate and an acidifier is simultaneously fed with stirring at from 55 to 85° C., preferably at a temperature identical with that in step b) and/or c), until a solids content of from 90 to 140 g/l has been reached, e) n acidifier is used for acidification to a pH of from about 2.5 to 5.0 and f) filtration and drying is carried out.

The viscosity rise point here corresponds to the juncture at which a marked rise starts to occur in the viscosity of the precipitation suspension during the course of precipitation, in which connection cf. EP 0643015.

It is preferable that in at least one of the steps a) to e), preferably in at least one of the steps b) to e), particularly preferably in the steps b) to d) and very particularly preferably in the steps b) to e), the precipitation suspension is subjected to severe shear by means of an additional shear assembly. It is preferable that in the steps b) and d) the sulfuric acid is metered directly onto the shear head of the additional shear assembly, in such a way as immediately to produce intensive incorporation of the acid by mixing into the precipitated suspension, and thus very homogeneous and rapid dispersion.

The initial charge can amount to about 20, 30, 40, 50, 60, 70, 80 or 90% of the final precipitation volume. The basic compounds added to the initial charge have in particular been selected from the group of the alkali metal hydroxides, alkaline earth metal hydroxides, alkali metal carbonates, alkali metal hydrogencarbonates and alkali metal silicates. Waterglass and/or sodium hydroxide solution are preferred.

Sulfuric acid is preferably used as acidifier. However, it is also possible to use other acidifiers, such as HCl, $HNO_3$, $H_3PO_4$ or $CO_2$.

The alkali metal silicate or alkaline earth metal silicate used is preferably waterglass (sodium silicate solution with modulus of from 2.0 to 3.5 by weight) and/or other silicates, such as potassium silicate or calcium silicate. It is particularly preferable to use waterglass whose modulus is from 3.2 to 3.5 by weight and whose density is from 1.30 to 1.45 kg/l.

The alkali number set in the initial charge (step a) and the alkali number during steps b) and/or d) is from 20 to 40, preferably from 20 to 35, particularly preferably from 25 to 35.

The preferred manner of addition of the alkali metal silicate and/or alkaline earth metal silicate and of the acidifier during step b) and/or d) is that the alkali number of the reaction solution is kept constant during the respective precipitation step. "Constant" means that the alkali number can deviate from the specified value by at most 2% during the respective precipitation step.

Each of the components added in steps b) and d) can have identical or different concentrations and/or inflow rates. In one process variant, the concentration of the components used in both steps is identical, but the inflow rate of the components in step d) is greater than in step b). It is particularly preferable that the inflow rate of the components in step d) is from 125 to 140% of the inflow rate in step b).

Furthermore, additional addition of organic or inorganic salts can optionally take place during steps a) to e). This can be carried out in solution or in the form of a solid, in each case continuously over the addition time of the alkali metal silicate and/or alkaline earth metal silicate and of the acidifier, or in the form of a batch addition. It is also possible to dissolve the salts in one or both components and then add them together with these.

Step e) is preferably executed in two stages. The inflow rate of the acidifier in the first substep is preferably from 90 to 110% and in the second substep is preferably from 40 to 60% of the inflow rate of step d).

Alkali metal salts or alkaline earth metal salts are preferably used as inorganic salts.

In particular, it is possible to use any combination of the following ions:

$Li^+$, $Na^+$, $K^+$, $Rb^+$, $Be^{2+}$, $Mg^{2+}$, $Ca^{2+}$, $Sr^{2+}$, $Ba^{2+}$, $H^+$, $F^-$, $Cl^-$, $Br^-$, $I^-$, $SO_3^{2-}$, $SO_4^{2-}$, $PO_3^{3-}$, $PO_4^{3-}$, $NO_3^-$, $NO_2^-$, $CO_3^{2-}$, $OH^-$, $TiO_3^{2-}$, $ZrO_3^{2-}$, $ZrO_4^{4-}$, $AlO_2^-$, $Al_2O_4^{2-}$, $BO_4^{3-}$.

Suitable organic salts are the salts of formic, acetic and propionic acid. A cation which may be mentioned is the alkali metal ions or alkaline earth metal ions. The concentration of these salts in the addition solution can be from 0.01 to 5 mol/l. The concentration of the salts includes all values and subvalues therebetween, especially including 0.05, 0.1, 0.5, 1, 1.5, 2, 2.5, 3, 3.5, 4, 4.5 mol/l. $Na_2SO_4$ is preferably used as inorganic salt.

Filtering of the silicas of the present invention and their conversion to a liquid form (e.g. according to DE 2447613) and their drying over a long or short period are familiar to the person skilled in the art and can by way of example be found in the documents mentioned in this description. The manner of filtering and washing of the silica is preferably such that the conductivity of the final product is <2000 µS/cm and particularly <1300 µS/cm.

The silica of the present invention is preferably dried in a pneumatic dryer, spray dryer, staged dryer, belt dryer, rotating-tube dryer, flash dryer, spin-flash dryer or spray tower dryer. These drying variants include operation with an atomizer, with a single- or twin-fluid nozzle or with an integrated fluidized bed. By way of example, the spray drying can be carried out according to U.S. Pat. No. 4,094,771. A spray tower drying process can by way of example be carried out as described in EP 0937755. The average diameters of the spray-dried particles can be above 15 µm, preferably from 15 to 80 µm, measured by means of laser scattering. The spray-tower-dried particles preferably have average particle sizes, measured by means of sieve analysis (Alpine) above 80 µm, in particular above 90 µm, preferably above 200 µm. The content of U.S. Pat. No. 4,094,771 and of EP 0 937755 is hereby explicitly incorporated by way of reference into the present application.

A WP 50N/75 roll compactor from Alexanderwerk AG, Remscheid, Germany can by way of example be used for the granulation process. It is preferable that the pulverulent product here is deaerated by way of a horizontal feed system with single screw via a vacuum system, without further addition of binders or liquids, and simultaneously introduced uniformly between the bilaterally mounted vertically arranged rolls. The powder is pressed to give a crust and converted by means of a breaker to give granulated material of the desired maximum size.

The silicas of the present invention can optionally be modified with linear, cyclic or branched silanes, silazanes, siloxane compounds and/or organosilicon compounds. By way of example, the substituents can be composed of aliphatics, of olefins, of aromatics, or of arylaromatics, which in turn may have the following substituents: —SCN, —SH, —Cl, —NH$_2$, —OC(O)CHCH$_2$, —OC(O)C(CH$_3$)CH$_2$, —S, —S$_2$, —S$_3$, —S$_4$, or of hydroxy radicals, amino radicals, alkoxy radicals, silanol radicals, cyanide radicals, thiocyanide radicals, halogen radicals, sulfonic acid radicals, sulfonic ester radicals, benzoic acid radicals, benzoic ester radicals, carboxylic acid radicals, carboxylic ester radicals, acrylate radicals, methacrylate radicals and/or organosilane radicals.

It is preferable to use bifunctional silanes which firstly permit coupling to the filler containing silanol groups and second permit coupling to the polymer. Examples of these organosilicon compounds are: bis(3-triethoxysilylpropyl)tetrasulfane, bis(3-triethoxysilylpropyl)disulfane, vinyltrimethoxysilane, vinyltriethoxysilane, 3-mercaptopropyltrimethoxysilane, 3-mercaptopropyltriethoxysilane, 3-aminopropyltrimethoxysilane, 3-aminopropyltriethoxysilane. Other organosilicon compounds have been described in WO 99/09036, DE 10163945 and DE 10223658. The content of the patent specifications mentioned is hereby explicitly incorporated by way of reference into the content of the present application. In one preferred embodiment of the invention, bis(3-triethoxysilylpropyl)tetrasulfane or bis(3-triethoxysilylpropyl)disulfane can be used as silane.

The optionally granulated, ungranulated, milled and/or unmilled precipitated silicas can be modified with one or more of the compounds mentioned in mixtures of from 0.5 to 50 parts, based on 100 parts of precipitated silica, in particular from 1 to 15 parts and very particularly from 1 to 10 parts, based on 100 parts of precipitated silica, and the reaction between precipitated silica and the compounds mentioned can be carried out during preparation of the mixture (in situ) or externally via spray application and subsequent heat-conditioning of the mixture, via mixing of the modifier and of the silica suspension with subsequent drying and heat-conditioning (e.g. according to DE 3437473 and DE 19609619) or according to the process described in DE 19609619 or DE 4004781.

The carbon content of the modified silica is from 0.1 to 20% by weight, preferably from 0.1 to 10% by weight and particularly preferably from 0.5 to 5% by weight. The carbon content includes all values and subvalues therebetween, especially including 0.5, 1, 5, 10, 15% by weight.

The present invention also provides the use of silicas in elastomer mixtures, in vulcanizable rubber mixtures and/or in other vulcanizates, such as pneumatic or other tires, tire treads, cable sheathing, hoses, drive belts, conveyor belts, V-belts, roll coverings, shoe soles, gaskets and damping elements.

The precipitated silica of the present invention can be incorporated by mixing in elastomer mixtures, in tires or in vulcanizable rubber mixtures as reinforcing filler in amounts of from 5 to 200 parts, based on 100 parts of rubber, in the form of powder, spherical product or granulated materials, either with or without organic post-treatment. The amount of filler includes all values and subvalues therebetween, especially including 20, 40, 60, 80, 100, 120, 140, 160, and 180 parts based on 100 parts of rubber.

For the purposes of the present invention, rubber mixtures and elastomer mixtures are to be regarded as equivalent.

The elastomer mixtures or rubber mixtures may also have been filled with one or more fillers of relatively high or relatively low reinforcing character, alongside mixtures which comprise exclusively the silica of the present invention as fillers, with or without the organic post-treatment mentioned.

The following materials can be used as other fillers:
Carbon blacks: the carbon blacks to be used here are produced by the flame black process, furnace black process or gas black process and have BET surface areas of from 20 to 200 m$^2$/g, examples being SAF carbon blacks, ISAF carbon blacks, HSAF carbon blacks, HAF carbon blacks, FEF carbon blacks or GPF carbon blacks. The carbon blacks can, if appropriate, also comprise heteroatoms, such as silicon.

Fine-particle fumed silicas, produced by way of example via flame hydrolysis such as silicon halides. The silicas can also, if appropriate, be present in the form of mixed oxides with other metal oxides, such as Al oxides, Mg oxides, Ca oxides, Ba oxides, Zn oxides and titanium oxides.

Other commercially available silicas,

Synthetic silicates, such as aluminum silicate, alkaline earth metal silicates such as magnesium silicate or calcium silicate, with BET surface areas of from 20 to 400 m$^2$/g and with primary particle diameters of from 10 to 400 nm.

Synthetic or naturally occurring aluminum oxides and synthetic or naturally occurring aluminum hydroxides, Naturally occurring silicates, such as kaolin, and other naturally occurring silicon dioxide compounds, Glass fiber and glass fiber products (mats, strands) or glass microbeads, Starch and modified grades of starch, Naturally occurring fillers, e.g. clays and silaceous chalk.

The blending ratio here again depends on the property profile to be achieved in the finished rubber mixture. A ratio of from 5 to 95% between the silicas of the present invention and the other abovementioned fillers (also in the form of a mixture) is conceivable and is also realized in this context. The ratio includes all values and subvalues therebetween, especially including 10, 20, 30, 40, 50, 60, 70, 80 and 90%.

In one particularly preferred embodiment, from 10 to 150 parts by weight of silicas, composed entirely or to some extent of the precipitated silica of the present invention, and also from 1 to 10 parts by weight of an organosilicon compound, can be used for production of the mixtures, if appropriate together with from 0 to 100 parts by weight of carbon black, based in each case on 100 parts by weight of rubber. The amount of silica includes all values and subvalues therebetween, especially including 20, 40, 60, 80, 100, 120, and 140 parts by weight per 100 parts by weight of rubber. The amount of organosilicon compound includes all values and subvalues therebetween, especially including 2, 3, 4, 5, 6, 7, 8, 9 parts by weight per 100 parts by weight of rubber. The amount of carbon black includes all values and subvalues therebetween, especially including 10, 20, 30, 40, 50, 60, 70, 80 and 90 parts by weight per 100 parts by weight of rubber.

The elastomers form another important constituent of the rubber mixture, alongside the precipitated silicas of the present invention, the organosilanes and other fillers. Mention may be made here of elastomers which are natural or synthetic, oil-extended or not, in the form of an individual polymer or a blend with other rubbers, examples being natural rubbers, polybutadiene (BR), polyisoprene (IR), styrene-butadiene copolymers with styrene contents of from 1 to 60% by weight, preferably from 2 to 50% by weight (SBR) in particular produced by means of the solution polymerization process, butyl rubbers, isobutylene-isoprene copolymers (IIR), butadiene-acrylonitrile copolymers with acrylonitrile contents of from 5 to 60% by weight, preferably from 10 to 50% by weight (NBR), partially hydrogenated or fully hydrogenated NBR rubber (HNBR), ethylene-propylene-diene copolymers (EPDM), and mixtures of these rubbers.

The following additional rubbers can also be used for rubber mixtures with the rubbers mentioned: carboxy rubbers, epoxy rubbers, trans-polypentenamer, halogenated butyl rubbers, rubbers derived from 2-chlorobutadiene, ethylene-vinyl acetate copolymers, ethylene-propylene copolymers, and, if appropriate, chemical derivatives of natural rubber and modified natural rubbers.

Preferred synthetic rubbers are described by way of example in W. Hofmann, Kautschuktechnologie [Rubber Technology], Genter Verlag, Stuttgart, Germany, 1980.

For production of the tires of the present invention, anionically polymerized S-SBR rubbers (solution SBR) whose glass transition temperature is above −50° C. are of particular interest, as also are mixtures of these with diene rubbers.

The method of incorporation of this silica and of production of the mixtures comprising this silica is the usual rubber industry method, in an internal mixer or on a roll mill, preferably at from 80 to 200° C. The available form or usage form of the silicas can be either powder, spherical product or granulated material.

The rubber vulcanizates of the present invention can comprise the usual added amounts of other rubber auxiliaries, examples being reaction accelerators, antioxidants, heat stabilizers, light stabilizers, ozone stabilizers, processing aids, plasticizers, tackifiers, blowing agents, dyes, pigments, waxes, extenders, organic acids, retarders, metal oxides, and also activators, such as triethanolamine, polyethylene glycol and/or hexanetriol. These compounds are known in the rubber industry.

The amounts of the rubber auxiliaries used can be the known amounts, depending inter alia on the intended use. Examples of conventional amounts are amounts of from 0.1 to 50% by weight, based on rubber. Sulfur or sulfur-donating substances can be used as crosslinking agents. The rubber mixtures of the present invention can moreover comprise vulcanization accelerators. Examples of suitable main accelerators are mercaptobenzothiazols, sulfenamides, thiurams, and dithiocarbamates in amounts of from 0.5 to 3% by weight. Examples of co-accelerators are guanidines, thioureas and thiocarbonates in amounts of from 0.5 to 5% by weight. The amounts of sulfur that can usually be used are from 0.1 to 10% by weight, preferably from 1 to 3% by weight, based on rubber.

The silicas of the present invention can be used in rubbers which are crosslinkable with accelerators and/or sulfur, or are peroxidically crosslinkable.

The rubber mixtures of the present invention can be vulcanized at temperatures of from 100 to 200° C., preferably from 130 to 180° C., if appropriate under pressure of from 10 to 200 bar. The blending of the rubbers with the filler, and if appropriate with rubber auxiliaries and with the organosilicon compound can be carried out in known mixing assemblies, such as rolls, internal mixers and mixing extruders.

The rubber mixtures of the present invention are suitable for production of moldings, e.g. for production of pneumatic tires, of tire treads for summer tires, winter tires and all-year-round tires, car tires, tires for utility vehicles, motorcycle tires, tire subcomponents, cable sheathing, hoses, drive belts, conveyor belts, roll coverings, shoe soles, gasket rings and damping elements.

When comparison is made with an identical rubber mixture with a known precipitated silica, rubber mixtures with the silicas of the present invention exhibit advantages in hysteresis behavior, fast vulcanization, and very good reinforcement performance. When comparison is made with a known silica whose surface area (CTAB) is in the same range, the silicas of the present invention have improved abrasion performance.

The rubber mixtures of the present invention are particularly suitable for production of car tire treads and of motorcycle tire treads, but also for tires for utility vehicles with reduced rolling resistance together with good abrasion resistance and good winter performance.

The rubber mixtures of the present invention are moreover suitable without addition of organosilicon compounds in a blend with a typical tire-tread carbon black for improvement of the Cut & Chip performance of tires for construction machinery, tires for agricultural machinery and tires for mining machinery. (For definition and further details, see "New insights into the tear mechanism" and references therein, presented by Dr. W. Niedermeier at Tire Technology 2003 in Hamburg, Germany).

The reaction conditions and the physicochemical data for the precipitated silicas of the present invention are determined by the following methods:

Determination of Solids Content of Filter Cake

This method is used to determine solids content of filter cake via removal of volatile content at 105° C.

To this end, 100.00 g of the filter cake are weighed (starting weight E) into a dry, tared porcelain dish (diameter 20 cm). If appropriate, the filter cake is comminuted with a spatula in order to obtain a free-flowing crumb material whose dimensions are at most 1 cm³. The specimen is dried to constant weight in a drying cabinet at 105±2° C. The specimen is then cooled to room temperature in a desiccator cabinet with silica gel as desiccant. The final weight A is determined gravimetrically.

Solids content (SC) is determined in % as follows:

$SC=A/E*100\%$, where A=final weight in g and E=starting weight in g.

Determination of Solids Content of Precipitation Suspensions

The solids content of the precipitation suspension is determined gravimetrically after filtration of the specimen.

100.0 ml of the homogenized precipitation suspension ($V_{suspension}$) are measured out at room temperature with the aid of a measuring cylinder. The specimen is filtered off with suction by way of a round filter (Schleicher & Schuell 572) in a porcelain suction filter funnel, but not sucked dry, thus preventing cracking of the filter cake. The filter cake is then washed with 100.0 ml of distilled water. The washed filter cake is transferred to a tared porcelain dish and dried to constant weight in a drying cabinet at 105±2° C. The weight of the dried silica ($m_{specimen}$) is determined after cooling to room temperature.

Solids content is determined as follows:

Solids content in g/l=($m_{specimen}$ in g)/($V_{suspension}$ in l).

Determination of Solids Content of Silica Feed

The silica feed is dried to constant weight in an IR dryer. The loss on drying is composed mainly of aqueous moisture.

2.0 g of silica feed are placed in a tared aluminum dish, and the lid of the IR drying unit (Mettler, LP 16) is closed. Once the start button has been pressed, drying of the suspension at 105° C. begins, and is automatically terminated when the loss in weight per unit of time becomes less than 2 mg/(120 s).

Loss in weight in % is directly displayed by the device on selection of 0-100% mode.

Solids content is calculated as follows:

Solids content in %=100%−loss in weight in %.

Determination of Alkali Number

Alkali number is the consumption of hydrochloric acid in ml (for 50 ml of specimen volume, 50 ml of distilled water and concentration 0.5 mol/l for the hydrochloric acid used) on direct potentiometric titration of alkaline solutions or suspensions to pH 8.30. This procedure detects the free alkali content of the solution or suspension.

The pH device (Knick 766 Calimatic pH meter with temperature sensor) and the pH electrode (Schott, N7680 combination electrode) are calibrated with the aid of two buffer solutions (pH=7.00 and pH=10.00) at room temperature. The combination electrode is immersed in the test solution or test suspension which is temperature-controlled to 40° C. and which is composed of 50.0 ml of precipitation suspension and 50.0 ml of deionized water. Hydrochloric acid solution whose concentration is 0.5 mol/l is then added dropwise to this mixture until the pH is constant at 8.30. Because the equilibrium between the silica and the free alkali content becomes established only slowly, a waiting time of 15 min is needed prior to final read-off of acid consumption. Given the selected amounts of substances and concentrations, the hydrochloric acid consumption read off in ml is directly equal to the alkali number, which is stated without dimensions.

pH Determination

The pH of the silica is determined on a 5% strength aqueous suspension at room temperature by a method based on DIN EN ISO 787-9. The starting weights were altered from the specifications of that standard (5.00 g of silica for 100 ml of deionized water).

Determination of Electrical Conductivity

Electrical conductivity of silicas was determined on a 4% strength aqueous suspension at room temperature by a method based on DIN EN ISO 787-14. The starting weights were altered from the specifications in that standard (4.00 g of silica for 100 ml of deionized water).

Moisture Determination

Silica moisture is determined to ISO 787-2 after 2 hours of drying in a drying cabinet with air circulation at 105° C. This loss on drying is composed mainly of aqueous moisture.

BET Surface Area Determination

Specific nitrogen surface area (hereinafter termed BET surface area) of the pulverulent, spherical or granular silica is determined to ISO 5794-1/Annex D, using an AREA-meter (Strohlein, JUWE).

CTAB Surface Area Determination

The method is based on adsorption of CTAB (N-hexadecyl-N,N,N-trimethylammonium bromide) on the "external" surface of the silica by a method based on ASTM 3765 or NFT 45-007 (section 5.12.1.3).

Adsorption of CTAB takes place in aqueous solution with stirring and ultrasound treatment. Excess CTAB not adsorbed is determined via back-titration with NDSS (sodium dioctyl sulfosuccinate solution, "Aerosol OT" solution), using a titroprocessor, the end point being given via the maximum of cloudiness of the solution and being determined by a phototrode. The temperature during all of the operations carried out is from 23 to 25° C. in order to prevent CTAB from crystallizing out. The following reaction equation underlies the back-titration process:

($C_{20}H_{37}O_4$)$SO_3$Na+BrN($CH_3$)$_3$($C_{16}H_{33}$) ⇒
($C_{20}H_{37}O_4$)$SO_3$N($CH_3$)$_3$($C_{16}H_{33}$)+NaBr NDSS CTAB

Equipment

METTLER Toledo DL 55 titroprocessor and METTLER Toledo DL 70 titroprocessor, in each case equipped with: Mettler DG 111 pH electrode and Mettler, DP 550 phototrode 100 ml polypropylene titration beaker 150 ml glass titration vessel with lid Pressure filtration device, capacity 100 ml Membrane filter composed of cellulose nitrate, pore size 0.1 µm, 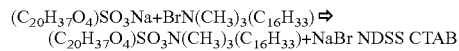47 mm, e.g. Whatman (Catalog. No. 7181-004)

Reagents

The solutions of CTAB ($C_{CTAB}$=0.015 mol/l in deionized water) and NDSS (concentration=0.00423 mol/l in deionized water) are purchased in ready-to-use form (Bernd Kraft GmbH, 47167 Duisburg: Catalog No. 6056.4700 CTAB solution, concentration 0.015 molil; Catalog No. 6057.4700 NDSS solution 0.00423 mol/l), and were stored at 25° C. and used within one month.

Method

1. Blind Titration

Consumption of NDSS solution for titration of 5 ml of CTAB solution is to be checked once daily prior to each series of tests. To this end, prior to start of the titration process, the phototrode is adjusted to 1000±20 mV (corresponding to 100% transparency).

Exactly 5.00 ml of CTAB solution are pipetted into a titration beaker, and 50.0 ml of deionized water are added. Titration with NDSS solution is carried out with stirring by the test method familiar to the person skilled in the art, using the DL 55 titroprocessor, as far as max. cloudiness of the solution. Consumption VA of NDSS solution in ml is determined. Each titration is to be carried out three times.

2. Adsorption 10.0 g of the pulverulent, spherical or granulated silica with moisture content of 5±2% (moisture content being adjusted, if appropriate via drying at 105° C. in a drying cabinet or uniform moistening) are comminuted for 30 seconds, using a mill (Krups KM 75, product No. 2030-70). Exactly 500.0 mg of the comminuted specimen (starting weight E) are transferred to a 150 ml titration vessel with magnetic stirrer rod, and exactly 100.0 ml of CTAB solution ($T_1$) are added. The titration vessel is sealed with a lid and the mixture is stirred by an Ultra-Turrax T 25 stirrer (KV-18G stirrer shaft, diameter 18 mm) at 18 000 rpm for at most 1 min until the material is completely wetted. The titration vessel is attached to the DL 70 titroprocessor by the screw thread, and the pH of the suspension is adjusted with KOH (0.1 mol/l) to a value of 9±0.05.

The suspension is then treated with ultrasound for 4 minutes in the titration vessel in an ultrasound bath (Bandelin, Sonorex RK 106 S, 35 kHz, 100 W Effective and 200 W maximum power) at 25° C. A membrane filter with nitrogen pressure of 1.2 bar is then used for immediate pressure filtration. 5 ml of foreruns are discarded.

3. Titration 5.00 ml of the remaining filtrate are pipetted into a 100 ml titration beaker and made up to 50.00 ml with deionized water. The titration beaker is attached by the screw thread to the DL 55 titroprocessor, and the titration with NDSS solution takes place with stirring until maximum cloudiness is reached. Consumption $V_B$ of NDSS solution in ml is determined. Each titration is to be carried out three times.

Calculation $$CTAB \text{ (not corrected for moisture level)} = \frac{V_A - V_B}{V_A} * \frac{C_{CTAB} * M_{CTAB} * T_1 * P}{E}$$

$V_A$=consumption of NDSS solution in ml during titration of blind specimen
$V_B$=consumption of NDSS solution in ml on using filtrate
$C_{CTAB}$=concentration of CTAB solution in mol/l
$M_{CTAB}$=molar mass of CTAB=364.46 g/mol
$T_1$=amount of CTAB solution added in l
P=volume occupied by CTAB=578.435 m²/g
E=starting weight of silica CTAB surface area is based on the anhydrous silica, and the following correction is therefore carried out:

$$CTAB = \frac{CTAB(\text{not corrected for moisture level}) \text{ in } m^2/g * 100\%}{100\% - \text{moisture level in } \%}$$

The moisture level of the silica is determined by the "Moisture determination" method described.

Determination of DBP Absorption

DBP absorption (DBP number) is determined as follows by a method based on the DIN 53601 standard, and is a measure of the absorbency of the precipitated silica:

12.50 g of pulverulent or spherical silica with from 0 to 10% moisture content (moisture content being adjusted if appropriate via drying at 105° C. in a drying cabinet) are added to the kneading chamber (product number 279061) of a Brabender "E" Absorptometer (without damping of the output filter of the torque sensor). In the case of granulated materials, the sieve fraction from 3.15 to 1 mm (Retsch stainless steel sieve) is used (via gentle pressing of the granulated materials by a plastics spatula through the sieve with pore width 3.15 mm). Dibutyl phthalate is added dropwise with a dosing rate of 4 ml/min at room temperature via a "Brabender T 90/50 Dosimat" into the mixture, with continuous mixing (rotation rate of kneader blades: 125 rpm). Only very little force is needed for the mixing-incorporation process, which is followed by using the digital display. Toward the end of the determination, the mixture becomes pasty, and this is indicated by means of a steep rise in force required. When the display shows 600 digits (torque 0.6 Nm) the kneader and the DBP metering are both switched off via an electrical contact. The synchronous motor for DBP input has coupling to a digital counter, and DBP consumption in ml can therefore be read off.

DBP absorption is stated in g/(100 g) and calculated using the following formula:

$$DBP = \frac{V*D*100}{E} * \frac{g}{100 \text{ g}} + K$$

where DBP=DBP absorption in g/(100 g)
V=DBP consumption in ml
D=DBP density in g/ml (1.047 g/ml at 20° C.)
E=starting weight of silica in g
K=correction value as in moisture correction table in g/(100 g)

DBP absorption is defined for the anhydrous, dried silica. If moist precipitated silicas are used, the correction value K has to be taken into account for calculation of DBP absorption. This value can be determined by using the following correction table, and for example silica water content of 5.8% would mean an added value of 33 g/(100 g) for DBP absorption. The moisture level of the silica is determined as in the method for "Determination of moisture level or loss on drying".

Moisture Correction Table for Dibutyl Phthalate Absorption (Anhydrous)

| % moisture level | .% moisture level | | | | |
|---|---|---|---|---|---|
| | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Sears Number Determination

The modified Sears number (hereinafter Sears number $V_2$) is a measure of the number of free silanol groups and can be determined via titration of silica with potassium hydroxide solution in the range from pH 6 to pH 9.

The determination method is based on the following chemical reactions, and ≡SiOH is intended to symbolize a silanol group of the silica:

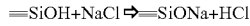

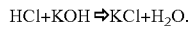

Method 10.00 g of a pulverulent, spherical or granular silica with moisture level of 5±1% are uniformly comminuted for 60 seconds, using an IKA M 20 universal mill (550 W; 20 000 rpm). If appropriate, the moisture content of the starting substance has to be adjusted via drying at 105° C. in a drying cabinet, or uniform wetting, and the comminution process repeated. 2.50 g of the resultant treated silica are weighed out at room temperature into a 250 ml titration vessel and mixed with 60.0 ml of methanol (analytical grade). Once the specimen has been completely wetted, 40.0 ml of deionized water are added, and an Ultra-Turrax T 25 stirrer (KV-18G stirrer shaft, diameter 18 mm) is used for dispersion for 30 seconds with rotation rate 18 000 rpm. 100 ml of deionized water are used to flush the specimen particles adhering to the edge of the vessel and to the stirrer into the suspension, and the temperature of the mixture is controlled to 25° C. in a water-bath with thermostat.

The pH measurement device (Knick 766 Calimatic pH meter with temperature sensor) and the pH electrode (Schott N7680 combination electrode) are calibrated by using buffer solutions (pH 7.00 and 9.00) at room temperature. The pH meter is first used to measure the starting pH value of the suspension at 25° C., and then, as a function of the result, potassium hydroxide solution (0.1 mol/l) or hydrochloric acid solution (0.1 mol/l) is used to adjust the pH value to 6.00. A dynamic titration method is selected with the following parameters: incremental titration volume $V_{min}$=0.05 ml to $V_{max}$=1.0 ml; waiting time between volume additions $t_{min}$=2.0 s to $t_{max}$=20.0 s. Consumption of KOH solution or of HCl solution in ml to pH 6.00 is $V_1'$. 20.0 ml of sodium chloride solution (250.00 g of NaCl (analytical grade) made up to 1 l with deionized water) are then added. 0.1 mol/l of KOH is then used for titration to a pH value of 9.00. Consumption of KOH solution in ml to pH 9.00 is $V_2'$.

The volumes $V_1'$ and, respectively, $V_2'$ are then first standardized to the theoretical starting weight of 1 g, and are multiplied by 5, to give $V_1$ and the Sears number $V_2$ in the units ml/(5 g).

Determination of Relative Breadth γ of Pore Size Distribution

This method is used to determine the relative breadth γ of the pore size distribution of silica by means of mercury porosimetry. The method is based on Hg intrusion to DIN 66133 (with surface tension of 480 mN/m and with a contact angle of 140°), using Micromeritics Autopore IV 9500 equipment.

The silica is pressure-treated prior to the measurement. For this, a manual hydraulic press is used (Catalog No. 15011, from Specac Ltd., River House, 97 Cray Avenue, Orpington, Kent BR5 4HE, U.K.). 250 mg of silica are weighed into a Specac Ltd. pellet die whose internal diameter is 13 mm, and are subjected to a load which is 1 metric ton as indicated by the display. This load is maintained for 5 s and is corrected if appropriate. The specimen is then depressurised and is dried in a drying cabinet at 105±2° C. for 4 h.

The starting weight of silica placed in the type 10 Penetrometer is, having an accuracy of 0.001 g, this being selected, for good reproducibility of the measurement, in such a way that the "stem volume used", i.e. the percentage Hg volume consumed for filling of the penetrometer is from 20% to 40%. The penetrometer is then slowly evacuated to 50 µm of Hg and kept at this pressure for 5 min.

The Autopore equipment is operated as in the operating instructions, using Software Version IV 1.05. Each measurement is corrected by a measurement of the penetrometer under empty conditions. The measurement range is from 0.0025 to 420 MPa, and at least 136 equilibrium measurement points (equipment-specific criterion of 10 s) are used (in the range from 0.0025 to 0.25 MPa: 30 points, in the range from 0.25 to 15 MPa: 53 points, 15 to 150 MPa: 40 points, in the range from 150 to 420 MPa: 13 points). If appropriate, the software introduces further measurement points if the incremental intrusion volume is >0.04 ml/g. The intrusion curve is smoothed by means of the "smooth differentials" function of the equipment software.

To determine the relative breadth γ of the pore size distribution, the following algorithm is applied to the data of the negative logarithmic derivative of the intrusion curve in the pore diameter range from 3.5 nm to 5 µm:

The algorithm utilizes a movable window starting from large pore diameters and composed of three successive measurement points of the negative logarithmic derivative of the intrusion curve, and draws a parabola through the points. The maximum of the parabola is defined as the required maximum A for a pore diameter a. A check is carried out as to whether the point a lies within the required pore diameter range and represents the global maximum of the negative logarithmic derivative of the intrusion curve. If that is not the case, the window is shifted by one point, a fresh parabola is drawn through the points, and the procedure is repeated until both criteria have been met. B is then defined as 0.300 A. Let b represent that pore diameter of the curve which is smaller than a, and at which the value B is achieved for the first time. Finally, the relative breadth γ of the pore size distribution is defined as γ=(a−b)/(A−B)=(a−b)/(0.7 A), where a and b have nanometer units and γ has the unit (g nm)/ml.

FIG. 1 shows a typical shape of curve for the negative logarithmic derivative of the cumulative pore volume V as in equation 1 with respect to pore diameter x with i measurement points and with the features a, b, A and B.

$$\frac{dV}{d\log x} = \frac{dV}{\frac{1}{x}dx} \quad \text{Equation 1}$$

$$= x\frac{dV}{dx}$$

$$x\frac{dV}{dx} \approx x\frac{\Delta V}{\Delta x}\Big|_{\Delta x = x_i - x_{i-1}}$$

$$= x_i \frac{V_i - V_{i-1}}{x_i - x_{i-1}}$$

$$\approx x_i \frac{V_{i+1} - V_{i-1}}{x_{i+1} - x_{i-1}}$$

Determination of Zeta Potential

This method determines the zeta potential of silica at pH 5 by means of electrokinetic sound amplitude (ESA).

To this end, the specimen is first dried for 5 h at 105° C.±2° C., and then 100 ml of a suspension with 1% by volume of silica are produced in distilled water. The particle density needed for this is determined by means of He pyknometry (DIN 66137-2). The dispersion process continues for 5 minutes by means of an ultrasound probe (Bandelin HD2200 Sonopuls with UW2200 ultrasound transducer, power 100%, cycle 8 (80% pulse, i.e. 0.8 s of power and 0.2 s of pause) with SH 213 G booster horn, TT 13 flat titanium tip, Ø13 mm, immersion depth 1 cm) in a 150 ml glass beaker (height 9.5 cm, external diameter 5 cm), which is cooled in an ice bath for the period of ultrasound treatment.

The suspension, brought to room temperature, is stirred with a magnetic stirrer and pumped by way of a peristaltic pump through the PPL-80 sensor of the Matec ESA-8000 device. The automatic potentiometric titration process takes place at room temperature with 5-molar $HNO_3$ and with a delay time of 30 s until a pH value of 5 has been reached. In the event that the starting pH value of the suspension is <5, the titration uses 5-molar NaOH solution until a pH value of 5 has been reached. Evaluation uses version pcava 5.94 of the equipment software.

Zeta potential is calculated at pH 5:

$$\zeta = \frac{ESA \cdot \eta}{\phi \cdot \Delta\rho \cdot c \cdot |G(\alpha)| \cdot \varepsilon}$$

$\zeta$ zeta potential $[10^{-3}$ V]
ESA electrokinetic sound amplitude at pH 5 [Pa m/V]
$\phi$ volume fraction (0.01)
$\Delta\rho$ difference in density between particles (see above) and liquid (0.997 kg/l)
c velocity of sound in suspension (1490 m/s)
$\eta$ viscosity of liquid (0.89 cP minus 2% per ° C. deviation from 25° C.)
$\varepsilon$ dielectric constant of suspension (78.36 As/Vm)
$|G(\alpha)|$ inertial correction (function of particle radius and of density, see manual)

The average particle radius value is needed for this determination and is determined by means of dynamic light scattering, using the above suspension treated with ultrasound. To this end, the Horiba LB-500 device is used (radius=0.5×mean of volume-weighted particle distribution, calculation level=50, cell thickness 1 cm, optical model: liquid refractive index, real=1.333; material refractive index, real=1.45; imaginary=0.01).

Determination of Particle Size by Means of Laser Scattering

The use of laser scattering for determining particle sizes of powders is based on the phenomenon that particles scatter monochromatic light in all directions with a varying intensity pattern. This scattering depends on the particle size. The smaller the particles, the greater are the scattering angles.

Specimen preparation and testing (flushing of module, etc.) uses deionized water in the case of hydrophilic precipitated silica, and uses pure ethanol in the case of precipitated silica which is not sufficiently water-wettable.

Prior to the start of measurement, the LS 230 laser scattering device (Coulter) and the liquid module (Small Volume Module Plus, 120 ml, Coulter) are run warm for 2 h, and the module is flushed three times with deionized water, and calibrated, and in the case of hydrophobic precipitated silicas is flushed three times with ethanol.

The file window "Calculate Opt. model" is selected by way of the menu item "Measurement" in the control bar of the equipment software, and the refractive indices are defined in an .rfd file: liquid refractive index r.I., real=1.332 (1.359 ethanol); material refractive index, real=1.46; imaginary=0.1; form factor 1. The following items are also selected in this file window: Offset measurement, Adjustment, Background measurement, Set measurement conc., Input specimen info., Input measurement. info., Measurement time 60 s, Number of measurements 1, Without PIDS data, Size distribution. The pump speed is set to 30% on the device.

The homogeneous suspension of 1 g of silica in 40 ml of deionized water is then added using a 2 ml disposable pipette to the liquid module of the device in such a way as to achieve constant concentration with from 8 to 12% light absorption, and that the device communicates "OK". The measurement takes place at room temperature. The software uses the raw data curve to calculate the particle size distribution and the d50 value (median value) on the basis of the volume distribution, taking into account Mie theory and the optical model parameters (.rfd file).

Determination of Sieve Residue (Alpine)

Figure 2:
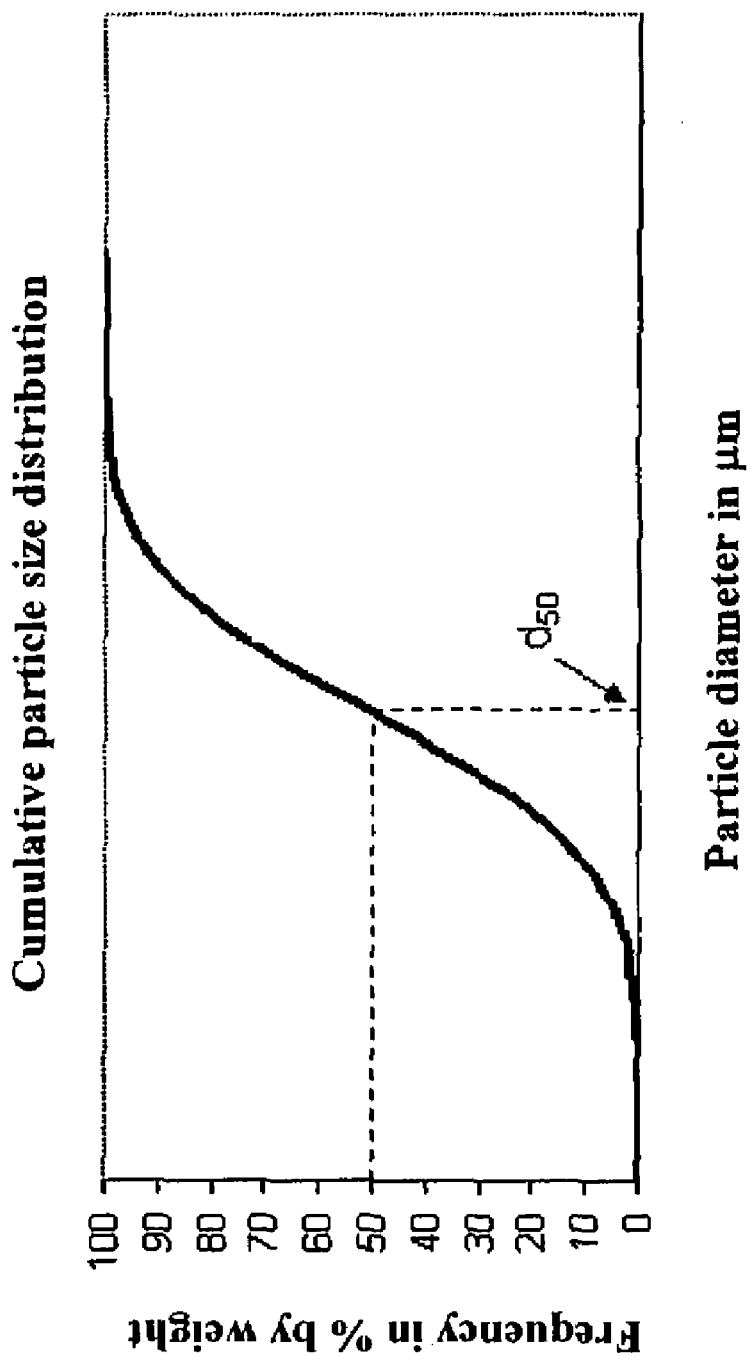
FIG. 2 shows the cumulative particle size distribution of the silica of the present invention.

This determination of sieve residue uses air-jet sieving by a method based on DIN ISO 8130-1 by means of Alpine S 200 air-jet sieve equipment. To determine the $d_{50}$ values of microgranulated materials and of granulated materials, sieves whose mesh width is >300 μm are also used here. For determination of the $d_{50}$ value, the sieves have to be selected in such a way as to give a particle size distribution from which the $d_{50}$ value can be determined as in FIG. 2. Graphical representation and evaluation uses a method based on ISO 2591-1, section 8.2.

The $d_{50}$ value is that particle diameter in the cumulative particle size distribution at which the particle diameter of 50% of the particles is smaller than or equal to that of the particles whose particle diameter is the $d_{50}$ value.

Determination of Sieve Residue (Ro-Tap)

This method determines the content of relatively coarse particles (>300 μm) and the content of relatively fine particles (<75 μm) in granulated materials by means of sieving.

Equipment used is a sieve pan, an analysis sieve with wire gauze (DIN ISO 565 T.2, nominal mesh width 75 μm), an analysis sieve with wire gauze (DIN ISO 565 T.2, nominal mesh width 150 μm), and an analysis sieve with wire gauze (DIN ISO 565 T.2, nominal mesh width 300 μm) in each case with sieve diameter 200 mm. The sieve stack is introduced in the sequence stated into a Tyler Ro-Tap B 8260 analysis sieve machine with automatic time switch, and a homogeneous amount of 100.00 g of the granulated silica material is transferred as specimen onto the uppermost sieve. The sieve lid and the beater are superposed and the sieving process takes place for 5 min with circular oscillation and beating.

The sieve residues (Ro-Tap) are determined as follows:

$$\text{sieve fraction (Ro-Tap, <75 μm) in \%} = (A_S/E)*100\%,$$
and
$$\text{sieve residue (Ro-Tap, >300 μm) in \%} = (A_{300}/E)*100\%, \text{ where}$$

$A_S$=final weight of residue in sieve pan in g, $A_{300}$=final weight of residue on sieve with 300 μm nominal mesh width in g and E=starting weight in g.

Determination of Carbon Content

Carbon content of silicas is determined by means of a LECO CS 244 elemental analyzer. Here, silica is weighed into a ceramic crucible and provided with combustion additives and heated under a stream of oxygen in an induction furnace. The carbon present here is oxidized to give $CO_2$. This amount of gas is quantified by way of infrared detectors.

Prior to the actual measurement, the device is calibrated with suitable reference material (e.g. tungsten carbide with 6.17% by weight of carbon). For silicas, from 150 to 200 mg are weighed with accuracy of 1 mg into a ceramic crucible. The specimen material is covered with 1 g of Lecocel II (powder of a tungsten-tin (10% strength) alloy) and 0.7 g of iron filings. The crucible is then sealed with a lid. The induction furnace is set to maximum power and flushed with oxygen for 10 s. After the crucible has then been placed in the induction furnace, automatic measurement and evaluation is started. Three determinations are carried out per specimen. The result is based on the original substance and is stated in % by weight.

Determination of Aluminum Oxide Content

Aluminum oxide content is determined by a method based on DIN EN ISO 3262-18 by means of flame atomic absorption spectroscopy at wavelength 309.3 nm.

About 20 g of a silica are weighed to accuracy of 0.01 g into a platinum crucible and moistened with distilled water. 1 ml of conc. hydrofluoric acid (40%, analytical grade) is added, and the mixture is heated to a fuming temperature in a sand bath. Nitric acid is progressively added dropwise until all of the silica has been dissolved. After evaporation to dryness, the residue is dissolved in 3 ml of conc, hydrochloric acid. The cooled solution is quantitatively transferred to a 100 ml measuring beaker, where it is made up to 100 ml with distilled water.

The resultant solution is studied in a flame atomic absorption spectrometer (wavelength: 309.3 nm, slit S: 0.7 nm, gas stream: acetylene/$N_2O$) as in the operating instructions.

Aluminum oxide content is determined on the original specimen, but the content is based on the specimen ignited at 1000° C. for 2 h:

$$\% \ Al_2O_{3 \ based \ on \ ignited \ substance} = \frac{\% \ Al_2O_{3 \ based \ on \ original \ substance} \times 100}{100\% - \text{ignition residue in } \%}$$

Determination of Dispersion Coefficient

Dispersion coefficient can be determined by means of a topographic method, described in: Entwicklung eines Verfahrens zur Charakterisierung der Füllstoffdispersion in Gummimischungen mittels einer Oberflächentopographie [Development of a method for characterizing filler dispersion in rubber mixtures by means of surface topography] A. Wehmeier; Degree thesis 1998 at the Technical University of Münster, Steinfurt site, Chemical Engineering Department, and Filler dispersion Analysis by Topography Measurements Degussa AG, Applied Technology Advanced Fillers, Technical Report TR 820.

As an alternative, the dispersion coefficient can also be determined by means of the DIAS method (optically) at the Deutsches Institut für Kautschuktechnologie in Hanover, Germany (see H. Geisler, DIK aktuell, 1st edition (1997) and Medalia, Rubber Age, April 1965).

The best degree of dispersion achievable is 100%, and accordingly the worst will theoretically be 0%. Silicas whose dispersion coefficient is greater or equal to 90% are regarded as highly dispersible (HD).

Explanation of dispersion of coefficient by means of surface topography:

$$\text{Dispersion coefficient} = 100\% - \frac{(\text{Total of areas underlying peaks}) \cdot 10000\% \cdot \text{Medalia factor}}{\text{Filler volume} \cdot (\text{total area tested})}\%$$

$$\text{Medalia factor} = \frac{\frac{\text{Filler volume}}{100\%} + 0.78}{2}$$

Dispersion coefficient in %
Total of areas underlying peaks (measure of roughness) in $mm^2$
Filler volume in %
total area tested in $mm^2$ Having generally described this invention, a further understanding can be obtained by reference to certain specific examples which are provided herein for purposes of illustration only, and are not intended to be limiting unless otherwise specified.

EXAMPLE 1

1202 l of water and 172.4 kg of waterglass (density 1.348 kg/l, 27.0% by weight of $SiO_2$, 8.05% by weight of $Na_2O$) were used as initial charge in a jacketed reactor (height 1.60 m, internal diameter 1.60 m) composed of stainless steel with dished end, MIC angled-blade stirrer system and Ekato fluid-shear turbine. 5.85 kg/min of the abovementioned waterglass and about 0.65 kg/min of sulfuric acid (density 1.83 kg/l, 96% by weight of $H_2SO_4$) were then fed simultaneously, with intensive stirring and shearing at a temperature of 79° C. over 35 min. Sulfuric acid was metered onto the shear turbine and this metering was controlled in such a way as to give a prevailing alkali number of 30.0+/−0.3 in the reaction medium over the entire feed time. Both additions of raw material were stopped, and the suspension obtained is intensively stirred and sheared for 60 min at 79° C. Finally, while intensive stirring and shearing at 79° C. were continued, 8.00 kg/min of the abovementioned waterglass and about 0.90 kg/min of the abovementioned sulfuric acid were fed simultaneously over 50 min. Again, metering of sulfuric acid was controlled in such a way that the prevailing alkali number in the reaction medium was 30.0+/−0.3. Waterglass addition was stopped, and addition of sulfuric acid was continued at 0.90 kg/min until a pH of 7.0 (measured at room temperature) had been reached. Directly thereafter, the final pH value of the suspension, which was 3.2 (measured at room temperature) was established using addition of sulfuric acid at 0.45 kg/min.

The suspension obtained was filtered using a membrane filter press, and the filter cake was washed with water. The filter cake, whose solids content was 21% by weight was then liquidized, using water and the abovementioned sulfuric acid and a dissolver. The silica feed with 18% by weight solids content and with a pH value of 4.2 was then spray-dried with added ammonia in such a way that the. pH value of the final product, measured on a 5% strength suspension, becomes 5.8. The roll granulation process uses a WP 50N/75 roll compactor from Alexanderwerk AG. The pulverulent product here was deaerated (subatmospheric pressure of 0.3 bar) via a vacuum system, without further addition of binders or liquids, by way of a horizontal infeed system with single screw (rotation rate 86 rpm), and simultaneously introduced between the bilaterally mounted, vertically arranged rolls. The powder was pressed at a rotation rate of 11 rpm and a pressure of 14 bar to give a crust, and was comminuted by means of a breaker (mesh width 8 mm). The fines were removed by sieving (mesh width 1.2 mm) using a vibrating sieve and were returned to the powder supply.

Table 1 lists the physicochemical data for a representative specimen of the powder (Example 1a) and of the granulated material (Example 1b).

Example 2

1202 l of water and 172.4 kg of waterglass (density 1.348 kg/l, 27.0% by weight of $SiO_2$, 8.05% by weight of $Na_2O$) were used as initial charge in a jacketed reactor (height 1.60 m, internal diameter 1.60 m) composed of stainless steel with dished end, MIC angled-blade stirrer system and Ekato fluid-shear turbine. 5.85 kg/min of the abovementioned waterglass and about 0.65 kg/min of sulfuric acid (density 1.83 kg/l, 96% by weight of $H_2SO_4$) were then fed simultaneously, with intensive stirring and shearing at a temperature of 70° C. over 42 min. The sulfuric acid was metered onto the shear turbine and this metering was controlled in such a way as to give a prevailing alkali number of 30.0+/−0.3 in the reaction medium. Both additions of raw material were stopped, and the suspension obtained was intensively stirred and sheared for 60 min at 70° C. Finally, while intensive stirring and shearing at 70° C. were continued, 8.00 kg/min of the abovementioned waterglass and about 0.90 kg/min of the abovementioned sulfuric acid were fed simultaneously over 45 min. Again, metering of sulfuric acid was controlled in such a way that the prevailing alkali number in the reaction medium was 30.0+/−0.3. Waterglass addition was stopped, and addition of sulfuric acid was continued at 0.90 kg/min until a pH of 7.0 (measured at room temperature) had been reached. Directly thereafter, the final pH value of the suspension, which was 3.2 (measured at room temperature) was established using addition of sulfuric acid at 0.45 kg/min.

The suspension obtained was filtered using a membrane filter press, and the filter cake was washed with water. The filter cake, whose solids content was 23% by weight, was then dried by a spin-flash drier. The product was granulated by a method based on Example 1.

Table 1 lists the physicochemical data for a representative specimen of the powder (Example 2a) and of the granulated material (Example 2b).

Example 3

1202 l of water and 172.4 kg of waterglass (density 1.348 kg/l, 27.0% by weight of $SiO_2$, 8.05% by weight of $Na_2O$) were used as initial charge in a jacketed reactor (height 1.60 m, internal diameter 1.60 m) composed of stainless steel with dished end, MIC angled-blade stirrer system and Ekato fluid-shear turbine. 5.85 kg/min of the abovementioned waterglass and about 0.65 kg/min of sulfuric acid (density 1.83 kg/l, 96% by weight of $H_2SO_4$) were then fed simultaneously, with intensive stirring and shearing at a temperature of 65° C. over 42 min. Sulfuric acid was metered onto the shear turbine and this metering was controlled in such a way as to give a prevailing alkali number of 30.0+/−0.3 in the reaction medium. Both additions of raw material were stopped, and the suspension obtained was intensively stirred and sheared for 60 min at 65° C. Finally, while intensive stirring and shearing at 65° C. were continued, 8.00 kg/min of the abovementioned waterglass and about 0.90 kg/min of the abovementioned sulfuric acid were fed simultaneously over 45 min. Again, metering of sulfuric acid was controlled in such a way that the prevailing alkali number in the reaction medium was 30.0+/−0.3. Waterglass addition was stopped, and addition of sulfuric acid was continued at 0.90 kg/min until a pH of 7.0 (measured at room temperature) had been reached. Directly thereafter, the final pH value of the suspension, which was 3.3 (measured at room temperature) was established using addition of sulfuric acid at 0.45 kg/min.

The suspension obtained was filtered using a membrane filter press, and the filter cake was washed with water. The filter cake, whose solids content was 21% by weight was then liquidized, using water and the abovementioned sulfuric acid and a dissolver. The silica feed with 18.5% by weight solids content and with a pH value of 4.0 was then spray-dried with added ammonia in such a way that the pH value of the final product, measured on a 5% strength suspension, becomes 5.8, and the product was granulated by a method based on Example 1 at a pressure of 13 bar.

Table 1 lists the physicochemical data for a representative specimen of the powder (Example 3a) and of the granulated material (Example 3b).

TABLE 1

|  | Unit | Example 1a | Example 1b | Example 2a | Example 2b | Example 3a | Example 3b |
| --- | --- | --- | --- | --- | --- | --- | --- |
| Available form |  | Powder | Granulated material | Powder | Granulated material | Powder | Granulated material |
| Moisture level | % | 5.7 | 5.7 | 6.0 | 6.4 | 6.1 | 6.6 |
| pH value | — | 5.8 | 6.0 | 7.1 | 7.0 | 5.8 | 6.0 |
| Conductivity | µS/cm | 410 | 380 | 110 | 110 | 470 | 450 |
| BET surface area | m$^2$/g | 242 | 249 | 311 | 296 | 304 | 293 |
| CTAB surface area | m$^2$/g | 118 | 122 | 150 | 145 | 165 | 170 |
| DBP absorption | g/(100 g) | 287 | 238 | 288 | 259 | 297 | 249 |
| Sears number $V_2$ | ml/(5 g) | 30.2 | 29.5 | 29.0 | 29.3 | 33.3 | 32.9 |
| Sears number $V_2$/CTAB | ml/(5 m$^2$) | 0.256 | 0.242 | 0.193 | 0.202 | 0.202 | 0.194 |
| BET/CTAB | — | 2.05 | 2.04 | 2.07 | 2.04 | 1.84 | 1.72 |
| Zeta potential | mV | −19.3 | −18.3 | −14.9 | −15.8 | −15.3 | −16.3 |

TABLE 1-continued

| | Unit | Example 1a | Example 1b | Example 2a | Example 2b | Example 3a | Example 3b |
|---|---|---|---|---|---|---|---|
| Relative breadth γ of pore size distribution | (g nm)/ml | 6.4 | 6.5 | 4.7 | 4.7 | 5.3 | 5.3 |
| Sieve residue (Ro-Tap, >300 μm) | % | — | 91.2 | — | 93.3 | — | 92.2 |
| Sieve fraction (Ro-Tap, <75 μm) | % | — | 3.0 | — | 2.8 | — | 2.4 |
| Al$_2$O-Content | | 0 | 0.14 | 0.15 | 0.14 | 0.14 | 0.14 | 0.13 |

APPLICATION-RELATED EXAMPLES

Examples 1b, 2b, 3b are used for production of rubber mixtures and vulcanizates.

The formulation (Standard Green Tire) used for the rubber mixtures is stated in Table 2 below. The unit "phr" here means parts by weight based on 100 parts of the untreated rubber used.

TABLE 2

Standard Green Tire

| Substance | phr | Product name | Company |
|---|---|---|---|
| *1. Stage Primary mixing* | | | |
| Buna VSL 5025-1 | 96 | S-SBR; oil-extended (see Text) | Lanxess Europe GmbH & Co. KG; 51369 Leverkusen; Germany |
| Buna CB 24 | 30 | cis-1,4-BR (see Text) | Lanxess Europe GmbH & Co. KG; 51369 Leverkusen; Germany |
| silicaKS) of the present invention | 80 | | |
| X 50-S | 12.8 | Si 69 (Bis(3-triethoxysilylpropyl)tetrasulfane)/ N 330 carbon black: 50%/50% | Degussa AG; Frankfurt am Main; Germany |
| ZnO; RS RAL 844 C | 3.0 | ZnO | Arnsperger Chemikalien GmbH; 50858 Cologne; Germany |
| EDENOR ST1 GS | 2.0 | Palmitic stearic acid; stearin "iodine number 1" | Caldic Deutschland GmbH & Co. KG; 40231 Düsseldorf; Germany |
| Naftolen ZD | 10.0 | aromatic plasticizer oil | Chemetall GmbH; 60487 Frankfurt a.M.; Germany |
| Vulkanox.4020/LG | 1.5 | N-(1,3-dimethylbutyl)-N'-phenyl-p-phenylenediamine (6PPD) | Rhein Chemie Rheinau GmbH; 68219 Mannheim Rheinau; Germany |
| Protektor G 3108 | 1.0 | Mixtures of refined hydrocarbon waxes | Paramelt BV; 706875 Paramelt BV; NL 1704 RJ Heerhugowaard; The Netherlands |
| *2. Stage Remill stage* | | | |
| Batch from stage 1 | | | |
| *3. Stage Final mixing* | | | |
| Batch from stage 2 | | | |
| Vulkacit D | 2.0 | N,N'-diphenylguanidine (DPG) | Rhein Chemie Rheinau GmbH; 68219 Mannheim Rheinau; Germany |
| Vulkacit CZ/EG-C | 1.5 | N-cyclohexyl-2-benzothiazolesulfenamide (CBS) | Rhein Chemie Rheinau GmbH; 68219 Mannheim Rheinau; Germany |
| Perkacit TBZTD | 0.2 | Tetrabenzylthiuram disulfide (TBzTD) | Flexsys N.V./S.A., Woluwe Garden; B-1932 St. Stevens Woluwe; Belgium |
| Ground sulfur | 1.5 | Fine-particle sulfur Ph Eur, BP | Merck KGaA; 64271 Darmstadt; Germany |

The polymer VSL 5025-1 is a solution-polymerized SBR copolymer from Bayer AG (now Lanxess Europe GmbH & Co. KG) whose styrene content (by means of UV spectroscopy) is about 25+/−2% by weight and whose vinyl content (by means of IR spectroscopy) is about 50+/−4% by weight. The copolymer comprises about 27% by weight of aromatic mineral oil (from 25.8 to 28.8% by weight) and its Mooney viscosity (ASTM D1646) is about 50+/−5 MU.

The polymer Buna CB 24 is a cis-1,4-polybutadiene (titanium type) from Bayer AG (now Lanxess Europe GmbH & Co. KG) whose cis-1,4 content (by means of IR spectroscopy) is at least 96% by weight and whose Mooney viscosity (DIN 53523) is about 45 MU (39 MU–49 MU).

TABLE 3

| | Mixing specification |
|---|---|
| 1st stage | GK 1.5N internal mixer, fill level 0.73, 70 rpm, chamber temperature 70° C., ram pressure 5.5 bar |
| 0.0'-0.5' | Polymers |
| 0.5'-1.5' | ⅓ KS, X 50-S; purge at 1.5' |
| 1.5'-2.5' | ⅓ KS; purge at 2.5' |
| 2.5'-3.5' | ⅓ KS, remaining constituents; purge at 3.5' |

TABLE 3-continued

Mixing specification

| | |
|---|---|
| 3.5'-5.0' | Mixing, if appropriate variation of rotation rate required in order to achieve discharge temperature |
| 5.0' | Discharge batch (batch temperature from 145° C. to 155° C.) and transfer to roll: Cut and displace the material 3 times toward the left, 3 times toward the right Fold the material over 5 times narrow, 5 times wide, Peel milled sheet away |
| 24 h of intermediate storage at room temperature for stage 2 | |
| 2nd stage | GK 1.5N internal mixer, fill level 0.71, 80 rpm, chamber temperature 80° C., ram pressure 5.5 bar |
| 0.0'-2.0' | Plasticize batch from stage 1 |
| 2.0'-5.0' | Use rotation rate variation to keep batch temperature at 150° C. |
| 5.0' | Discharge batch (batch temperature from 145° C. to 155° C.) and transfer to roll: Cut and displace the material 3 times toward the left, 3 times toward the right Fold the material over 5 times narrow, 5 times wide, Peel milled sheet away |
| 4 h of intermediate storage at room temperature for stage 3 | |
| 3rd stage | GK 1.5N internal mixer, fill level 0.69, 40 rpm, chamber temperature 50° C., ram pressure 5.5 bar |
| 0.0'-2.0' | Batch from stage 2, accelerator, sulfur |
| 2.0' | Discharge batch (batch temperature from 90° C. to 110° C.) and transfer to roll: Cut and displace the material 3 times toward the left, 3 times toward the right Fold the material over 5 times narrow, 5 times wide, Peel milled sheet away |

12 h of intermediate storage at room temperature prior to start of tests

The general method for production of rubber mixtures and their vulcanizates is described in the following book: "Rubber Technology Handbook", W. Hofmann, Hanser Verlag 1994.

The vulcanization time for each of the specimens at 165° C. was 20 min for Example 1b and 3b and 15 min for Example 2b.

The test methods stated in Table 4 are used for vulcanizate testing.

TABLE 4

| Physical testing | Standard/Conditions |
|---|---|
| ML 1 + 4, 100° C., 3rd stage (MU) | DIN 53523/3, ISO 667 |
| Vulcameter testing, 165° C., MDR, deflection 0.5° Dmax – Dmin (dNm) t 80% – t 20% (min) t 10% and t 90% (min) | DIN 53529/3, ISO 6502 |
| Ring tensile test, 23° C. Stress value (MPa) | DIN 53504, ISO 37 |
| Shore A hardness, 23° C. (SH) | DIN 53 505 |
| Ball rebound (%) | DIN EN ISO 8307, drop height 500 mm, steel ball, d = 19 mm, 28 g |
| DIN abrasion, force: 10 N (mm³) | DIN 53 516 |
| Dispersion coefficient (%) | see text |
| Viscoelastic properties, 0° C. and 60° C., initial force 50 N and amplitude force 25 N, Heat-conditioning time 5 min, Test value recorded after 30 s of test time Complex modulus E* (MPa) Loss factor tan δ (–) | DIN 53 513, ISO 2856 |

The tables presented below show the application-related data for Examples 1b, 2b and 3b, which were compounded and tested as in Tables 2-4.

TABLE 5

| | | Ultrasil VN 2 GR | Example 1b |
|---|---|---|---|
| ML 1 + 4 | MU | 66 | 72 |
| t 10% | min | 1.6 | 1.9 |
| t 90% | min | 6.7 | 6.3 |
| t 80% – t 20% | min | 2.5 | 2.2 |
| Stress value 300% | MPa | 12.0 | 12.6 |
| Shore A hardness | SH | 66 | 65 |
| DIN abrasion | mm³ | 78 | 75 |
| Ball rebound, 23° C. | % | 30.3 | 34.5 |
| Ball rebound, 60° C. | % | 58.3 | 64.7 |
| E*, 0° C., 10 Hz | MPa | 22.7 | 16.8 |
| E*, 60° C., 16 Hz | MPa | 10.1 | 9.0 |
| tan δ, 60° C., 16 Hz | — | 0.126 | 0.102 |

TABLE 6

| | | Ultrasil 7000 GR | Example 2b |
|---|---|---|---|
| ML 1 + 4 | MU | 72 | 83 |
| t 10% | min | 1.4 | 1.3 |
| t 90% | min | 6.4 | 5.4 |
| t 80% – t 20% | min | 2.5 | 2.1 |
| Stress value 300% | MPa | 11.0 | 12.2 |
| Shore A hardness | SH | 66 | 67 |
| DIN abrasion | mm³ | 100 | 96 |
| Ball rebound, 23° C. | % | 30.0 | 31.4 |
| Ball rebound, 60° C. | % | 58.0 | 60.8 |
| E*, 0° C., 10 Hz | MPa | 22.2 | 23.1 |
| E*, 60° C., 16 Hz | MPa | 9.2 | 9.9 |
| tan δ, 60° C., 16 Hz | — | 0.121 | 0.112 |

TABLE 7

| | | Ultrasil 7005 | Example 3b |
|---|---|---|---|
| ML 1 + 4 | MU | 80 | 90 |
| t 10% | min | 1.1 | 1.5 |
| t 90% | min | 7.3 | 6.7 |
| t 80% – t 20% | min | 3.1 | 2.8 |
| Stress value 300% | MPa | 11.8 | 11.7 |
| Shore A hardness | SH | 69 | 70 |
| DIN abrasion | mm³ | 118 | 113 |
| Ball rebound, 23° C. | % | 30.8 | 32.7 |
| Ball rebound, 60° C. | % | 58.3 | 62.1 |
| E*, 0° C., 10 Hz | MPa | 29.3 | 24.0 |
| E*, 60° C., 16 Hz | MPa | 10.5 | 10.5 |
| tan δ, 60° C., 16 Hz | — | 0.134 | 0.121 |

References used in the Standard Green Tire formulation were commercially available silicas from Degussa AG, the CTAB surface area range of which (see Table 8) was the same as that of the respective silica of the present invention to be tested. This ensures that the vulcanizate results are effectively comparable.

TABLE 8

| | Unit | Ultrasil VN 2 GR | Ultrasil 7000 GR | Ultrasil 7005 |
|---|---|---|---|---|
| BET surface area | m²/g | 127 | 172 | 180 |
| CTAB surface area | m²/g | 129 | 158 | 171 |
| relative breadth γ of pore size distribution | (g nm)/ml | 3.8 | 3.4 | 3.5 |

Since the specific BET surface areas of the silicas of the present invention are very high, it would hardly be expected that the mixtures in the examples would have processable viscosities. However, the precipitated silicas from Examples 1b to 3b are found to have only slightly increased Mooney viscosities. This indicates that the precipitated silicas of the present invention have surprisingly good processability. Furthermore, all three of the precipitated silicas have increased t 80%-t 20% crosslinking rate, and indeed there was an advantageous lengthening of the t 10% scorch times in the case of the silicas of Example 1b and 3b.

The advantages of the precipitated silicas of the present invention are shown most clearly by the dynamic data. Here, marked improvements in hysteresis loss were obtained, discernable in the increased ball rebound value and the reduced tan δ values. The level of the E* values was likewise good.

The very good reinforcement performance of the silicas of the examples was discerned in the 300% stress value, whose level was the same as or even improved over that of the respective reference.

For all three of the precipitated silicas studied (Examples 1b, 2b and 3b), the dispersion coefficients in the standard green tire formulation were above 90% and these were therefore classified (Table 9) as highly dispersible (HD) silicas.

TABLE 9

| Medalia dispersion coefficients | | |
|---|---|---|
| Example 1b | Example 2b | Example 3b |
| 97% | 92% | 98% |

The vulcanizate performance described was in particular attributable to the breadth γ of the pore size distribution. Silica morphologies are present which are substantially more stable than those known hitherto and which therefore, despite good dispersibility, remain present even after incorporation into the rubber matrix. The result of this is regions with high silica density and regions in which the polymer matrix prevails, and the latter regions here especially lead to markedly lower hysteresis losses.

More polymer is coupled than is generally customary by way of the bifunctional silane, especially by virtue of the high number of silanol groups and of the high density of silanol groups (Sears number $V_2$/CTAB). Very good reinforcement performance is produced, and this is indicated via the high 300% stress value and the low DIN abrasion value.

By virtue of the low zeta potential of the silicas of the present invention and of the attendant increased surface activity, it is possible to achieve a marked increase in polymer/silica interaction, which is normally small because of the different polarities, this improvement is indicated via the increased reinforcement performance.

German patent application 10 2005 043201.8 filed Sep. 9, 2005, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A precipitated silica, having the following physicochemical parameters:

| | |
|---|---|
| a relative breadth γ of pore size distribution of | 4.0-10.0 (g nm)/ml, |
| a sears number $V_2$ of | 28-40 ml/(5 g), |
| a sears number $V_2$/CTAB ratio of | 0.18-0.28 ml/(5 m$^2$), and |
| CTAB of | 100-200 m$^2$/g. |

2. The precipitated silica according to claim 1, wherein a BET/CTAB ratio is greater than 1.3.

3. The precipitated silica according to claim 1, wherein a zeta potential at pH 5 is from −12 to −30 mV.

4. The precipitated silica according to claim 1, wherein an oil adsorbency expressed as DBP number is from 200 to 330 g/(100 g).

5. The precipitated silica according to claim 1, wherein an $Al_2O_3$ content is from 0.001 to 5% by weight.

6. The granular precipitated silica according to claim 1, wherein a (Ro-Tap) sieve residue on a 300 μm sieve is at least 80% by weight.

7. The granular precipitated silica according to claim 1, wherein a <75 μm (Ro-Tap) sieve fraction is at most 10% by weight.

8. The precipitated silica according to claim 1, wherein the silica has a carbon content of from 0.1 to 20.0% by weight.

9. An elastomer mixture, comprising:
the precipitated silica of claim 1.

10. The vulcanizable rubber mixture or vulcanizate, comprising:
at least one precipitated silica according to claim 1 as a filler.

11. A tire, comprising:
at least one precipitated silica according to claim 1.

12. A process for production of precipitated silica, comprising:
in succession,
a) using, as an initial charge, an aqueous solution of at least one member selected from the group consisting of an alkali metal silicate, an alkaline earth metal silicate, an organic base, an inorganic base and mixtures thereof, the alkali number of the initial charge being from 20 to 40,
b) simultaneously metering alkali metal silicate and/or alkaline earth metal silicate and acidifier into said initial charge with intensive stirring at from 55 to 85° C. until the viscosity rises in the reaction mixture,
c) stopping the feed for from 35 to 85 minutes,
d) simultaneously feeding alkali metal silicate and/or alkaline earth metal silicate and an acidifier with stirring at from 55 to 85° C., until a solids content of from 90 to 140 g/l has been reached in the reaction mixture,
e) acidifying said reaction mixture of step d) to a pH of from about 2.5 to 5.0 with an acidifier, and
f) filtering and drying said acidified reaction mixture, thereby obtaining dried precipitated silica.

13. The process according to claim 12, wherein in at least one of the steps a) to e), the reaction mixture is sheared with a shear assembly.

14. The process according to claim 13, wherein, in the steps b) and d), sulfuric acid is metered directly onto a shear head of the shear assembly, to immediately achieve intensive incorporation of the acid by mixing into the reaction mixture.

15. The process according to claim 12, wherein the inflow rate of the components in step d) is greater than in step b).

16. The process according to claim 15, wherein the inflow rate of the components in step d) is from 125 to 140% of the inflow rate in step b).

17. The process according to claims 12, wherein in step b) and/or d), alkali metal silicate and/or alkaline earth metal silicate and acidifier are metered in such a way that the alkali number remains constant during the respective step.

18. The process according to claim 12, wherein an alkali metal silicate and/or alkaline earth metal silicate and/or an alkali metal hydroxide and/or an alkaline earth metal hydroxide is used as base.

19. The process according to claim 12, wherein, during steps a) to e), an organic or inorganic salt is added.

20. The process according to claim 12, wherein a pneumatic dryer, spray dryer, staged dryer, belt dryer, rotating-tube dryer, flash dryer, spin-flash dryer or spray nozzle dryer is used for the drying process.

21. The process according to claim 12, wherein, after the drying process, a granulation process is carried out with a roll-press.

22. The process according to claim 12, wherein the precipitated silica is modified with linear, cyclic and/or branched silanes, silazanes, siloxane compounds and/or organosilicon compounds.

23. The process according to claim 22, wherein bis(3-triethoxysilylpropyl)tetrasulfane or bis(3-triethoxysilylpropyl)disulfane is used for modification of the precipitated silica.

* * * * *